United States Patent [19]

Marcus

[11] 4,425,717

[45] Jan. 17, 1984

[54] VEHICLE MAGNETIC SENSOR

[75] Inventor: Konrad H. Marcus, Holland, Mich.

[73] Assignee: Prince Corporation, Holland, Mich.

[21] Appl. No.: 391,550

[22] Filed: Jun. 24, 1982

[51] Int. Cl.³ .............................................. G01C 17/28
[52] U.S. Cl. ...................................... 33/361; 33/333;
33/355 R
[58] Field of Search ................. 33/361, 355 R, 363 R,
33/333, 347, 363 Q, 354

[56] References Cited

U.S. PATENT DOCUMENTS

| 3,778,703 | 12/1973 | Jackson | 33/361 |
| 4,163,326 | 8/1979 | Edwards | 33/361 |
| 4,277,751 | 7/1981 | Lawson et al. | 33/361 |
| 4,309,828 | 1/1982 | Sakamoto | 33/333 |

FOREIGN PATENT DOCUMENTS 55-110912  8/1980  Japan .................. 33/363 R

Primary Examiner—Willis Little
Attorney, Agent, or Firm—Price, Heneveld, Huizenga & Cooper

[57] ABSTRACT

The present invention incorporates a flux-gate sensor for a vehicle compass. The sensor is mounted in association with the mounting system for a rearview mirror mounted to the vehicle windshield. In one embodiment of the present invention, the flux-gate sensor is contained in the mounting bracket for the rearview mirror. This location isolates the sensor from the undesired effects of the metallic mass of the vehicle as well as the dashboard, typically housing the vehicle's wiring.

16 Claims, 2 Drawing Figures

VEHICLE MAGNETIC SENSOR

BACKGROUND OF THE INVENTION

The present invention relates to magnetic sensors and, particularly, to a flux-gate magnetic sensor for use in a vehicle.

Compasses for vehicles such as automobiles, typically, are after-market items of a relatively basic mechanical design. Such compasses, typically, attach to the dashboard of the vehicle and are of inexpensive construction including a compass card suspended by a pin bearing and mounted within a housing. Usually, they will include some elemental form of adjustment or compensation mechanism such as movable magents for adjusting the compass to north and south, depending on the geographical area of use of the vehicle.

The theory of operation of flux-gate magnetic sensors is well known and one application to the automotive environment is described in an article entitled "Magnetic Field Sensor and its Application to Automobiles" by Hisatsugu Itoh published on Feb. 25–29, 1980 by the Society of Automotive Engineers, Inc. as SAE Technical Paper No. 800123. The positioning of such a sensor in a vehicle is very important since the transitory magnetic fields produced by the vehicle's electrical system, as well as the ferrous material of the vehicle itself can adversely affect the operation and reliability of a compass employing such a sensor.

With the many magnetic fields surrounding the dashboard area of a vehicle, many of which are transitory in nature depending upon the operation of the vehicle and its accessories, the dashboard area is a poor location for magnetic sensors including a flux-gate sensor. Experimentation has resulted in the discovery that placement of a sensor such as a flux-gate sensor in the upper center windshield area of a vehicle provides an unexpectedly stable and reproducible environment for a magnetic sensor.

SUMMARY OF THE PRESENT INVENTION

The present invention incorporates a flux-gate sensor mounted in association with the rearview mirror mounting system where the rearview mirror is mounted to the vehicle windshield. In one embodiment of the present invention, the flux-gate sensor is mounted in the mounting bracket for the rearview mirror. This location isolates the sensor to some extent from the metallic mass of the vehicle as well as the dashboard, typically housing the vehicle's wiring. By incorporating the sensor in the rearview mirror assembly, a convenient mounting system is also provided.

These and other features, objects and advantages of the present invention can best be understood by reference to the following description thereof together with the accompanying drawings in which:

DETAILED DESCRIPTION OF THE PREFERRED EMBODIMENT

Figure 1:
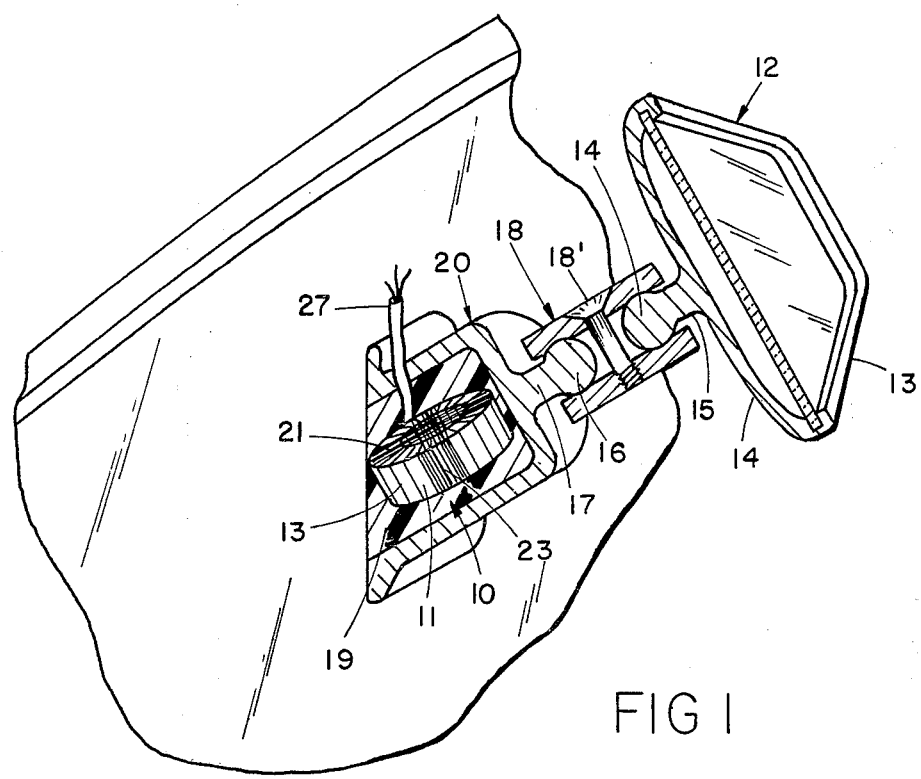
FIG. 1 is a fragmentary, top plan view of a rearview mirror for a vehicle shown partly broken away and incorporating a flux-gate type magnetic sensor.
Figure 2:
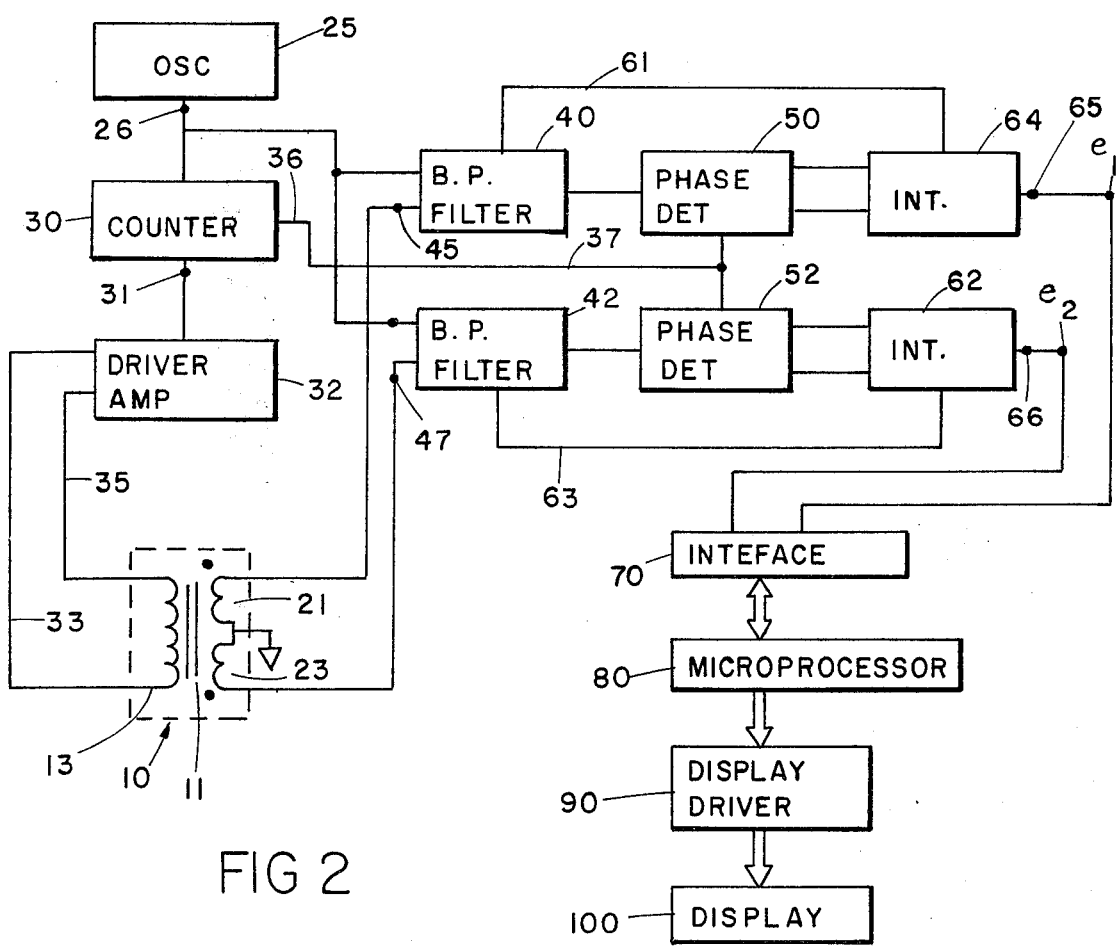
FIG. 2 is an electrical circuit diagram partly in block and schematic form showing a system embodying the present invention.

Referring initially to FIGS. 1 and 2, a flux-gate type magnetic sensor 10 is mounted within the mounting bracket 20 forming a portion of the mounting assembly for a rearview mirror 12 of a vehicle. The rearview mirror 12 including its housing 13 can be of conventional construction and is coupled to the mounting bracket 20 by means of a split sleeve 18 receiving a front ball 14 coupled to housing 13 by means of a stem 15. Bracket 20 includes a ball 16 which is held by sleeve 18 and secured in an adjustable fashion thereto by a screw 18'. Sleeve 18 can be of conventional construction in terms of the sockets for receiving fore and aft balls 14 and 16. Bracket 20 is typically secured to the windshield of a vehicle by means of an adhesive or in some cases by removeably being secured to a corresponding mating bracket adhered to the windshield or by connection to the vehicle headliner, in some instances.

The diameter of the cylindrical body of bracket 20 is slightly enlarged to receive the flux-gate sensor 10 which includes a toroidal core 11 having a generally rectangular cross section. The flux-gate sensor includes an excitation winding 13 helically wound around core 11 and orthogonally aligned first and second sensing windings 21 and 23, respectively, poled as shown by the dots in FIG. 2 and wound in orthogonal relationship to one another about the outside of the toroid as shown in FIG. 1 to provide orthogonally phased output signals of varying magnitude depending upon the sensed external or earth's magnetic field. Sensor 10 is secured within the non-ferro-magnetic barrel of bracket 20 by a suitable bonding or potting material 19 to be generally horizontally aligned. Also, it is positioned such that the North-South winding 21 is aligned to be parallel to the longitudinal axis of the vehicle. Electrical leads from the windings 13, 21 and 23 are extended from bracket 20 by a suitable cable 27 extending between the sensor 10 and the associated electrical circuits shown in FIG. 2. The positioning of the flux-gate sensor 10 within bracket 20, made preferably of a non-ferro-magnetic material such as aluminum or a polycarbonite, when the mirror assembly 12 is positioned on the upper center of the windshield area isolates sensor 10 from the major portion of the vehicle's electrical wiring which is located under the dashboard area as well as raises the sensor from the body of the vehicle to some extent thereby providing a relatively stable background magnetic environment for the sensor.

As shown in FIG. 2, the compass system includes an oscillator 25 which in the preferred embodiment is an R-C oscillator having an output frequency of approximately 80 kHz at output terminal 26 thereof. The output signal from oscillator 25 is applied to a counter circuit 30 providing 400 Hz at output terminal 31 which is applied to a driver amplifier 32 which subsequently applies the 400 Hz signals to excitation winding 13 of sensor 10 by means of conductors 33 and 35. Counter 30 also provides an 800 Hz signal at output terminal 36 which is applied to phase detector circuits 50 and 52. The output terminal 26 of oscillator 25 is also coupled to clock input terminals of digital bandpass filters 40 and 42. Filters 40 and 42 also include signal input terminals 45 and 47, respectively coupled to one end of sensing coils 21 and 23, as shown in FIG. 2, with the remaining terminals of coils 21 and 23 commonly coupled to system ground as shown in FIG. 2. The output of bandpass filters 40 and 42 are coupled to the input terminals of phase detectors 50 and 52 such that selected harmonic frequency signals, as described in greater detail below, are applied to each of the phase detectors which are actuated by an enabling signal from counter 30 via an enabling line 37 to apply positive and negative half-cycle sinusoidal signals received from sensing coils 21 and 23 through bandpass filters 40 and 42 to integrating and inverting amplifier circuits 62 and 64. The closed loop gain of the system is controlled through a feedback path including conductors 61 and 63 extending between integrating amplifier 64 and bandpass filter 40 and integrator 62 and bandpass filter 42, respectively. At the output terminals 65 and 66 of integrator 64 and 62, respectively, there is thus provided DC varying signals $e_1$ and $e_2$, respectively, which represent the direction information from sensing coils 21 and 23. The amplitude and polarity of $e_1$ and $e_2$ varies with vehicle direction with respect to the earth's magnetic field. These DC varying signals are applied to a suitable interface circuit 70, including for example, suitable amplifiers and an AD converter for converting the DC signal information to digital signals. The microprocessor 80 includes associated RAM and ROM memories with the ROM programmed to mathematically derive an output control signal in the form of the arc tangent of the ratio $e_1/e_2$ to provide a digital output control signal applied to a display driver circuit 90 for alpha display 100 such that octant direction information can be displayed to the vehicle operator. The processing of signals $e_1$ and $e_2$ from integrator circuits 62 and 64 by a conventional microprocessor and program to provide the $\tan^{-1} e_1/e_2$ in a digital format for octant display of a vehicle direction is entirely conventional. A more detailed description of the preferred electrical circuit for providing the direction signal information from the flux-gate sensor is presented in a copending patent application entitled ELECTRICAL COMPASS, Ser. No. 353,896 filed on Mar. 2, 1982 and assigned to the present assignee.

As is known, the flux-gate sensor 10 operates by the earth's or other external magnetic field off-setting the hysteresis curve for second harmonic frequency signals depending on the orientation of the flux-gate sensor with respect to the earth's magnetic field. Thus, it is desired to detect and measure the amplitude of the second harmonic (i.e. 800 Hz) signals from detection coils 21 and 23 which are orthogonally related. In order to synchronize the detection of the second harmonic frequency signals by phase detectors 50 and 52, the 800 Hz signals from counter 30 are applied to input terminals of the phase detectors.

The signals applied to phase detectors 50 and 52, however, are first filtered by bandpass filters 40 and 42 to substantially eliminate (40 db suppression) all but the second order harmonic frequencies. This is achieved by applying the signals from coils 21 and 23 to the signal input terminals of bandpass filters 40 and 42, respectively. Circuits 40 and 42 are each ½ of a commercially available National Semiconductor integrated circuit chip, model number MF-10, which is a switched capacitor sampled data filter driven by the 80 kHz clock oscillator 25 to provide an amplifier gain of approximately 1000 and having a Q of 50 to substantially eliminate all but the second harmonic frequency information coupled to the input terminals of phase detectors 50 and 52. The phase detectors are synchronized in phase with this second harmonic information by the 800 Hz signal applied to their clock input terminals from counter 30 such that signals are applied to the output terminals of detectors 50 and 52 only during a precise and predetermined phase relationship to the fundamental driving frequency of 400 Hz applied to driver amplifier 32. In practice, the 800 Hz signals applied to synchronize phase detectors 50 and 52 are off-set approximately 90° from the fundamental driving frequency such that the transition from logic zero to logic one and back occur during the enable portion of the signals applied to detectors 50 and 52 at the second harmonic frequency. Since the phase detectors as well as the driver amplifier are locked to the clock oscillator 25 through the counter circuit, this precise and predetermined phase relationship can be selected and maintained to provide a maximum amplitude output signal from the phase detectors for a given output signal from sensing coils 21 and 23 without the necessity of tuning. The output signals of detectors 50 and 52 are applied to opposite polarity inputs of integrating circuits 64 and 62 to provide output signals $e_1$ and $e_2$ at output terminals 65 and 66. Signals $e_1$ and $e_2$ indicate the direction of orientation of the flux-gate sensor with respect to earth's magnetic field, and therefore, that of the vehicle in which the sensor is mounted. By providing signals $e_1$ and $e_2$, corresponding to the orthogonal coordinates of direction and each of which can have a positive or negative polarity relative to floating ground, all the information necessary for the vehicle heading is available in these two signals. As noted above, these analog signals are converted into a digital format and applied to a microprocessor for providing digital information to a display 100, as shown in FIG. 2.

Various modifications to the preferred embodiment of the present invention can be made. Thus, for example, the display 100 may be digital, as shown, or an analog type. If desired, the microprocessor can provide information other than the alpha information corresponding to the octant headings (N, NE, E, SE, S, SW, W, NW) and, for example, can display degree heading or other magnetic field information.

These and other modifications to the preferred embodiment of the present invention will become apparent to those skilled in the art and fall within the spirit and scope of the present invention as defined by the appended claims.

The embodiments of the invention in which an exclusive property or privilege is claimed are defined as follows.

1. A system for mounting a magnetic sensor to a vehicle having a headliner and a rearview mirror mounted in the upper windshield area, said system comprising:
   a rearview mirror assembly adapted to be mounted proximate to the windshield of a vehicle, said assembly including a flux-gate magnetic sensor and means for positioning said sensor in the windshield area between the vehicle headliner and the rearview mirror near the headliner; and
   means for supplying operating electrical current to said sensor and for receiving electrical signals therefrom.

2. The system as defined in claim 1 wherein said mirror assembly includes a housing for a rearview mirror, and said positioning means includes a mounting bracket for attachment of said assembly to a vehicle, said assembly further including means for pivotally coupling said housing to said bracket to permit adjustment of said rearview mirror, and wherein said flux-gate sensor is mounted within said bracket.

3. The system as defined in claim 2 wherein said bracket includes a body made of a non-ferrous material.

4. The system as defined in claim 3 wherein said flux-gate sensor is fixedly positioned within said body by a bonding agent.

5. The system as defined in claim 4 wherein said means for supplying operating current to said flux-gate sensor and for receiving signals therefrom comprises an electrical cable extending from said assembly.

6. An electrical compass system for a vehicle having a headliner and a rearview mirror mounted in the upper windshield area, said system comprising:
   a rearview mirror assembly adapted to be mounted proximately to the windshield of a vehicle, said assembly including a flux-gate magnetic sensor and means for positioning said sensor in the windshield area near the headliner between the vehicle headliner and the rearview mirror;
   means for supplying operating electrical current to said sensor and for receiving electrical signals therefrom;
   circuit means coupled to said supplying means for processing signals from said sensor; and
   display means coupled to said circuit means for displaying the vehicle heading as sensed by said flux-gate sensor.

7. The system defined in claim 6 wherein said mirror assembly includes a housing for a rearview mirror, and said positioning means includes a mounting bracket for attachment of said assembly to a vehicle, said assembly further including means for pivotally coupling said housing to said bracket to permit adjustment of said rearview mirror, and wherein said flux-gate sensor is mounted within said bracket.

8. The system as defined in claim 7 wherein said bracket includes a body made of a non-ferrous material.

9. The system as defined in claim 8 wherein said flux-gate sensor is fixedly positioned within said body by a bonding agent.

10. The system as defined in claim 9 wherein said means for supplying operating current to said flux-gate sensor and for receiving signals therefrom comprises an electrical cable extending from said assembly.

11. An electrical compass system for a vehicle having a headliner and a rearview mirror mounted in the upper windshield area, said system comprising:
    a flux-gate magnetic sensor;
    means for positioning said sensor in the central windshield area between the vehicle headliner and the rearview mirror near the headliner of the vehicle;
    means for supplying operating electrical current to said sensor and for receiving electrical signals therefrom;
    circuit means coupled to said supplying means for processing signals from said detector; and
    display means coupled to said circuit means for displaying the vehicle heading as sensed by said detector.

12. The system as defined in claim 11 wherein said positioning means comprises a rearview mirror assembly.

13. The system as defined in claim 12 wherein said mirror assembly includes a housing for a rearview mirror, a mounting bracket for attachment of said assembly to a vehicle, and means pivotally coupling said housing to said bracket to permit adjustment of said rearview mirror, and wherein said flux-gate sensor is mounted within said bracket.

14. The system as defined in claim 13 wherein said bracket includes a body made of a non-ferrous material.

15. The system as defined in claim 14 wherein said flux-gate sensor is fixedly positioned within said body in predetermined alignment by a bonding agent.

16. The system as defined in claim 15 wherein said means for supplying operating current to said flux-gate sensor and for receiving signals therefrom comprises an electrical cable extending from said assembly.

* * * * *